United States Patent
Thomas

(10) Patent No.: US 7,908,195 B2
(45) Date of Patent: Mar. 15, 2011

(54) SYSTEM FOR CALCULATING MODEL OPTION SETTLEMENT PRICES

(76) Inventor: Bruce Bradford Thomas, Trumbull, CT (US)

( * ) Notice: Subject to any disclaimer, the term of this patent is extended or adjusted under 35 U.S.C. 154(b) by 0 days.

(21) Appl. No.: 12/799,937

(22) Filed: May 5, 2010

(65) Prior Publication Data

US 2010/0223174 A1 Sep. 2, 2010

Related U.S. Application Data

(63) Continuation of application No. 12/321,225, filed on Jan. 20, 2009, which is a continuation of application No. 12/008,581, filed on Jan. 11, 2008, now abandoned.

(51) Int. Cl.
*G06Q 40/00* (2006.01)

(52) U.S. Cl. .................. 705/35; 705/37; 705/36 R

(58) Field of Classification Search ............. 705/37, 705/36 R; 703/2
See application file for complete search history.

(56) References Cited

U.S. PATENT DOCUMENTS

| 7,024,384 B2 * | 4/2006 | Daughtery, III ............ 705/36 R |
| 7,065,475 B1 * | 6/2006 | Brundobler ...................... 703/2 |
| 2002/0010670 A1 * | 1/2002 | Mosler et al. .................. 705/37 |
| 2003/0154153 A1 * | 8/2003 | Steidlmayer et al. ........... 705/37 |
| 2003/0225657 A1 * | 12/2003 | Whaley et al. ................. 705/36 |
| 2007/0255635 A1 * | 11/2007 | Multer et al. ............... 705/36 R |

* cited by examiner

*Primary Examiner* — Jason M Borlinghaus
*Assistant Examiner* — Samica L Norman

(57) ABSTRACT

A computer implemented system for calculating a cash settlement price for a Model Option Contract, an option contract that confers a contractual right that enables the option holder to force delivery of a cash settlement price that is determined by using a settlement price determination methodology that is specified in the option contract which includes a description of an option pricing model and the input values that will be used to run the option pricing model and determine the contract's cash settlement price.

14 Claims, 5 Drawing Sheets

| Option Comparison | | |
|---|---|---|
| | Model Option | Traditional Option |
| Traditional Option Terms: | | |
| Type of Contract (Put/Call) | Call | Call |
| Underlying Asset | 1 Share of Allstate Corp. Common Stock | 1 Share of Allstate Corp. Common Stock |
| Strike Price | $36.00 | $36.00 |
| Expiration Date | 6/10/2010 | 6/10/2010 |
| Ability to Exercise | American | American |
| Non-Traditional Option Terms: | | |
| Cash Settlement Right (In addition to or in lieu of the right to sell the contract for cash or the right to force an exchange of cash for the reference asset) | The contract holder may sell the contract, or pay the strike price to force delivery of the reference asset, or force the option seller to pay a cash settlement price that is determined by a settlement price determination methodology specified in the contract, within 3 hours after the daily close of the NYSE. | None Specified |
| Settlement Price Determination Methodology: | | |
| Option Valuation Model To Be Used | Generalized Black & Scholes | None Specified |
| Additional Input Values: | | |
| Asset Price | Daily closing price of NYSE | None Specified |
| Time to Maturity | Optionable days remaining divided by annual optionable days | None Specified |
| Risk-free Rate of Return | 0.50% | None Specified |
| Dividend Yield | 2.40% | None Specified |
| Cost of Carry | -1.90% | None Specified |
| Volatility | 30% | None Specified |

FIG. 1

SYSTEM FOR CALCULATING MODEL OPTION SETTLEMENT PRICES

CROSS-REFERENCE TO RELATED APPLICATIONS

This application is a continuation of pending nonprovisional patent application Ser. No. 12/321,225, filed Jan. 20, 2009, entitled "System for Settling Model Option Contracts" by the present inventor. That application was a continuation of nonprovisional patent application Ser. No. 12/008,581, filed on Jan. 11, 2008 now abandoned, entitled "Model Option Contracts" by the present inventor. The present application claims the benefit of the filing date of patent application Ser. No. 10/757,933 filed Jan. 15, 2004 now abandoned, entitled "Model Options," by the present inventor.

FEDERALLY SPONSORED RESEARCH

Not Applicable

SEQUENCE LISTING OR PROGRAM

Not Applicable

BACKGROUND OF THE INVENTION

1. Field of Invention

This invention relates to a computer-implemented information system and software for calculating settlement prices for Model Option Contracts.

2. Background of the Invention

Options

Option contracts give the holder a right to buy or sell property at a specified price, called the strike or exercise price, within a given period of time. The life of an option is called the contract's term and is determined by the expiration date of the contract. The payment that is exchanged for this right is called the option premium. If the option holder does not exercise his right prior to the contract's expiration, the option expires worthless.

Having the right but not the obligation to buy or sell property at some prespecified price is valuable. This is why option buyers are willing to pay option sellers a premium for this right. Since options derive their value from the price of the underlying assets they are considered derivatives.

The Value of an Option

An option's value can be thought of as having two primary components. The intrinsic value is the value that an investor would get if she immediately exercised the option. This is the difference between the current price and the exercise price and is also described as "moneyness." If the option has a positive intrinsic value, it is said to be "in-the-money." "Deep in-the-money" options refer to options that have a substantially positive intrinsic value.

The second component of an option's value results from how likely and in what direction the intrinsic value of the option is expected to change over the life of option. This is known as the "time value" of an option, and it is a function of the underlying asset's propensity to change in value and the remaining life of an option.

Although many options expire without value, most options that are in-the-money are bought or sold, rather than exercised. This is because exercising an option early forfeits the remaining time value of the option. Also, exercising an option and converting it into the underlying property destroys the financial leverage that options enable.

Financial Leverage

Options are beneficial because they allow the holder to gain financial leverage by buying just the portion of the underlying property that the holder believes is desirable. For example, a speculator who believes that a particular stock will rise to $60 within the next three months from its current price of $50 has a choice of buying the underlying stock or call options on the stock.

Assuming that the speculator has $5,000 to invest and a three-month option to buy one share at a strike price of $50 cost $3.58, the speculator can buy either 100 shares of the stock or purchase 1,396 options to buy the stock. The call options are significantly cheaper than the stock because they are only valuable if the stock price increases above $50 per share during the next three months.

If the speculator is correct and the stock price increases to $60, she will make $1,000 if she purchases the stock. She will make $8,962 if she purchases the options ($60−$50=$10 per share increase times $1,396 options=$13,960 less the option premium of $4,998). Thus, it can be seen that it is much more financially efficient for the speculator to buy options than to buy the underlying stock.

Option Usage

Exchanges facilitate the trading of options on stock, commodities, currencies, and debt instruments. An exchange can be a physical location or an electronic mechanism where trading takes place. Exchanges may be set up and function in many different ways. For example, they can act as a counter-party between buyers and sellers or they can merely provide information that enables buyers and sellers to trade directly with one another.

Although options can be traded directly between two individuals or companies, this rarely happens in practice. This is because exchanges assist in the price discovery process and provide a valuable role in minimizing credit risk.

Options are used in many different ways. Speculators use options to bet on the underlying property increasing or decreasing in value over some specified period of time. Assuming a speculator believes that the underlying property's price will decrease, she may purchase a put option, giving her the right to sell that property to the option seller at a pre-specified price. Conversely, if she believes that the price will increase, she may desire to purchase a call option that will give her the right to buy the property from the option seller at a pre-specified price.

Many investors use options to hedge or offset the risk of some component of their portfolio. For example, a stockholder who is concerned that stock prices may fall dramatically might buy put options and sell call options to limit the potential loss of value. Similarly, manufacturers may desire to hedge price increases or decreases associated with their raw material inventories.

Options Classified by Exercise Features

There are three main ways in which the exercise feature of options is generally structured. American style options enable the holder to exercise the option at any point prior to the expiration date. European style options only enable the holder to exercise the option on the expiration date. Burmudian options may be exercised at any one of various pre-set points during the life of the option.

Options as Compensation

Companies routinely grant options as compensation (i.e. compensation options) in exchange for work or other services. This is commonly referred to as an "incentive stock option" since it is often granted to corporate managers and employees as a means of motivating them to achieve certain financial and operational objectives. Compensation options are usually granted at a strike price that is at the price of the underlying stock on the grant date and these options often vest over a period of future employment such as three or four years. In addition, incentive stock options usually have much longer terms than exchange traded stock options.

Option Pricing Models

A number of mathematical models have been developed to determine the "theoretical value" of an option. However, it is important to point out that the "theoretical value" of an option is not the same thing as the "actual value" of an option. For example, the theoretical value of a call option is a mathematical value that is derived from making certain assumptions about the performance of the reference asset and the risk free rate of return. The actual value is the value that the holder can generate from the option either by selling the option, if that is contractually possible, or by paying the option seller the strike price and forcing delivery of the reference asset. The problem for option users is that the theoretical value of an option and the actual value of an option are usually not the same.

The first of these mathematical models to achieve widespread acceptance was the Black and Scholes Option Pricing Model which was introduced in 1973. This model is predicated upon the following assumptions: the stock pays no dividends; European exercise terms are used; markets are efficient; no commissions are charged; interest rates are known and constant; and returns are lognormally distributed. Since each of these assumptions can be debated, this model has been modified over time, and other models have been developed to correct certain perceived weaknesses of the Black and Scholes Model.

For example, the Binomial Model breaks down the time to the expiration of an option into discrete intervals. At each interval, the stock is assumed to increase or decrease by a certain amount based on its volatility and time to expiration. In effect, this produces a tree of potential stock prices over the life of the option with each branch representing a possible path that the stock price could take during the remaining life of the option. Probabilities are then applied to each path to produce the expected value of the option.

Although a number of option price models have been developed since the Black and Scholes Model, this Model is still widely used due to the fact that it can be calculated faster than some of the newer models that require far more calculations. Calculation speed is critically important because market prices can change very quickly, and even the most advanced computers may have trouble calculating theoretical values fast enough to keep up with these changes.

Despite the different techniques that they employ, the models typically require most of the same basic inputs to create an option's theoretical value. Inputs to the models may vary based on the type of option and the referenced asset.

For example, the basic inputs for American style options on common stock are: whether the option is a put or call, the current asset price, the exercise or strike price, the time to expiration or maturity, the risk-free interest rate, the dividend rate or yield, the cost of carry, and the volatility of the underlying asset. Other option valuation models may require other inputs. For example, Binomial and Trinomial option valuation models also require the user to specify the number of time steps and Merton's Jump Diffusion model requires the user to specify the number of jumps per year.

Uncertain Option Values

Despite new and improved option pricing models, there is still significant uncertainty about what the value of an option is. This uncertainty is resident before the contract is entered into and extends until the date the contract expires, at which point the theoretical value and the market value converge.

Actual option prices may vary significantly from the theoretical values of the option pricing models due to a lack of liquidity. Thin trading may impede price discovery and allow for greater pricing imperfections. This may cause significant pricing distortions on options that do not trade very much such as options on smaller companies, option contracts with expiration dates greater than one year, and deep out-of-the-money contracts.

However there are significant differences between the model values and the market values even when options are heavily traded. Proponents of option pricing-models naturally assume that these differences are caused by different market participants using different assumptions about the inputs to those models.

Since the current stock price, the exercise price, and the time to expiration are fixed, these parameters are not subject to dispute. While the risk-free interest rate and the dividend rate may change, these values do not generally change enough over short-periods of time to cause big changes in option values.

Thus, the parameter most in dispute is the volatility of the underlying stock. Historical volatility can vary significantly based on how the calculation is done and by how many days of historic price changes are used to derive this number.

Implied Volatility

One can take the current market value of an option and the other less contentious model inputs described above and substitute volatilities into the model until it produces a theoretical value that is equal to the market value of the option. This number is called "implied volatility." In essence, implied volatility is how market participants reconcile actual option prices with the theoretical values derived from the models they use.

One way to describe the difference between historical volatility and implied volatility is to say that market participants think the historical experience of a stock's price changes were abnormal. In effect, they think that the historical experience was more or less volatile than what will happen over the future life of the option.

For those participants who believe that their chosen option pricing model adequately describes the value of an option, implied volatility may be useful for reconciling the model with the market. However, this number is not very meaningful for deep in or out-of-the-money options, where extraordinary amounts of volatility are required to change the option value by relatively small amounts of money.

New Approach Needed

Given how useful they can be, options are not employed nearly as much as they should be. There are several fundamental reasons why options are not used more.

First, option calculations are relatively complicated and difficult for the average investor to understand. The learning curve is steep for most investors, and the details of option usage are difficult to explain to the uninitiated. This lack of understanding makes many investors uncomfortable with using options.

Second, since most options are traded on exchanges, option prices are subject to market distortions which may prevent even the most astute observers from being able to use them effectively. While there is significant trading of stock options at or near-the-money for the largest companies, there may be little or no trading of deep out-of-the-money options on those stocks. Moreover, there is not much liquidity for options that extend beyond one year or for options on the stocks of smaller companies either.

Third, although theoretical models of option valuation may help provide some insight into the pricing of options, they are also problematic. There are now many models to choose from, each with some subtle difference, each meant to address some theoretical problem. Despite all of the advances, there are still significant differences between the model prices and the market price of options. Such differences are confusing to investors. Either the models are wrong or the market is wrong, but how is the investor to know which is right?

Forth, since there is not much of a market for long-duration options such as incentive stock options, one cannot compare the model valuations to the market valuations for such options. Thus, one cannot even demonstrate that the models work as well in such situations as they do on contracts with lesser expiration dates. This is problematic given that current accounting treatment requires companies to ascribe a fair value to incentive stock options.

Meanwhile employees may not attribute much or any value to the options that they are granted because they may not have fully vested, typically have no intrinsic value, and cannot be sold. Moreover, most employees have no understanding of option valuation models.

Fifth, the trading cost of using options can impair the use of deep out-of-the-money options. This is because the expense of trading such options gets too large in relation to the expected value of such options.

Ultimately option usage is curtailed because people do not understand how they work and are suspicious that option prices may be incorrect, regardless of whether they are derived from an option pricing model or the market. In effect, the degree of moneyness, company size characteristics, and near-term expiration dates all limit the potential size of the options market and in turn limit the usefulness of options to investors.

OBJECTS AND ADVANTAGES

The object of the invention is to create a method and an information system that enables companies and individuals to calculate cash settlement prices for a new type of option contract called a Model Option Contract. The use of this new type of option and the ability to calculate a cash settlement price enables option users to employ the financial leverage and theoretical characteristics of options without being bound by the limitations and imperfections of the traditional option market. Model Option Contracts objectify the uncertainty associated with option trading using an agreed value approach. Model Option Contracts help expand the usefulness of options by enabling participants to easily understand the components of option valuation and to provide ready and continuous access to a cash price at which the option can be settled, even when there is no active options market.

In the case of compensation options, where the contract is granted in exchange for work or other services, companies and employees can use Model Option Contracts to bridge the gap that exists between the option expense that the grantor must recognize in its books and records and the value that employees think the option grants have. To a large extent this "valuation gap" is caused by the holder's inability to see a market price for these options so they tend to ignore the time value of the options granted.

Since most compensation options are granted with little or no intrinsic value, assessing the time value of the options granted is critically important to understanding the overall value of these options. By structuring an option as a Model Option Contract, the company creates a cash settlement price that is visible to the grantee that provides a benchmark for how much the options are worth. Using this business method, companies can provide their employees with continuous prices at which they may sell their options back to the company.

With Model Options, buyers and sellers no longer need to be wary of long-duration, or deep out-of-the-money options. They can confidently employ options to help them gain financial leverage because they can be confidant that thin markets and poor liquidity will not distort the cash settlement price that is embedded in these contracts.

Since price discovery is not necessary for Model Option Contracts, buyers and sellers can trade without the need for a traditional market such as an options exchange. By alleviating the need for options to be traded on an exchange, option usage can be significantly expanded and trading costs can be reduced. This is especially true for deep out-of-the-money options where the expected value of such options may be less than the transaction fees.

The cash settlement feature of Model Option Contracts facilitate option trading on small company stocks by alleviating market participants fears of pricing distortions, lack of liquidity, and the potential for manipulation as well as their need for an exchange to trade such options. Currently, options exchanges are not interested in such trading because it does not represent a significant amount of transaction volume, and the cost of such activity is not worth their trouble.

Model Option Contract cash settlement prices can be generated continuously, enabling interim settlements of value, which mitigates counterparty credit risk. For example, buyers and sellers could agree that they will make interim payments to one another for increases and decreases in the value of an option once a given counterparty's liability exceeds a certain threshold.

Unlike traditional options, Model Option Contracts can be structured so that they do not allow the holder to force delivery of the underlying asset. Instead, the parties can structure a Model Option Contract so that the holder is only able to demand a cash payment from the option seller at a price that is determined by the settlement price determination methodology that is embedded in the option contract.

This feature reduces transaction costs and may be especially useful when option traders have no real interest in transferring the underlying property but just want to profit or minimize losses associated with changes in value of that property. Many option holders are not interested in converting the option into the underlying property (in the case of a call option) or transferring the underlying property to the option seller (in the case of a put option). The cash settlement feature of a Model Option enables the option holder to dispense with the additional steps and cost of having to pay or receive the strike price in order to take delivery or make delivery of the underlying asset in order to sell that asset or buy a replacement asset, or of having to find a buyer for the option in order to liquidate the option position. Each of these steps involves expense.

Another useful feature of Model Option Contracts is that they can be constructed so that each of the component parts of an option's time value can be isolated and traded separately. For example, option buyers and sellers can structure Model Option Contracts so that they are effectively only trading just the volatility component of an option, or just the dividend yield component.

Further objects and advantages are to increase the use of options by making their values more understandable and more reliable and by making them more cost-effective to trade. Other objects and advantages will become apparent from a consideration of the ensuing description and drawings.

SUMMARY OF THE INVENTION

The invention is an information system and method for calculating the cash settlement price of a Model Option contract. A Model Option Contract ("Model Option") is a new type of option contract that gives the option holder the right to force the option seller to pay (deliver) a cash settlement price that is determined by implementing a settlement price determination methodology that is specified in the contract. A Model Option Contract, may be structured so that this right to force the option seller to deliver the cash settlement price is in addition to or in lieu of the contract holder's right to sell the contract or the right to force an exchange of cash for the underlying or reference asset.

Constructing a Model Option Contract requires specification of the traditional option terms that would be specified in any traditional option contract such as whether it is a put or call, the underlying asset, a strike price, an expiration date or contract term, and the type of exercise that is allowed (American, European, etc.). However, it must also specify that the contract holder has the right to settle the contract by forcing the option seller to pay a cash settlement price that is calculated by using a settlement price determination methodology that is specified in the Model Option Contract.

This right to settle the contract by forcing a cash delivery without any accompanying transfer of the underlying or reference asset may be structured in countless ways. A Model Option Contract may be structured to give the option holder the right to force the option seller to pay the specified cash settlement price at a particular point or points in time, or it may grant this right continuously over the life of the contract. A Model Option Contract may be structured to give this additional settlement right continuously over the life of the contract unless certain specified events occur, or it may give this right only upon the occurrence of certain specified conditions.

For example, in the case of options used as compensation, personal conditions pertaining to the holder might be specified that would trigger this settlement right such as age, disability, loss of a loved one, etc. Alternatively, certain corporate conditions might trigger this right or prevent the holder from exercising this right including the possibility of a hostile takeover, the company's bankruptcy filing, or the advent of some other financial event. Other more general conditions that might be used to trigger this additional settlement right or nullify it would include changes in market indicia such as volume of trades, interest rate changes, etc.

The settlement price determination methodology employed in a Model Option must include a description of an option pricing model (such as the Black and Scholes, the binomial, etc.) and a description of how the input values necessary to run the option pricing model will be derived. Some of these input values, such as the strike price of the underlying asset, the time to maturity, and the exercise features will be obvious based on the traditional option terms of the contract. However, many additional input values will need to be specified so that there is no ambiguity as to what input values to use in the option pricing model specified.

For example, consider the case of a Model Option Contract with a common stock as the reference asset that specifies the use of a binomial option valuation model to determine the cash settlement price. The contract would need to specify enough information so that it would be obvious what values to use in the option valuation model for the asset price, the risk-free rate of interest, the dividend yield, the cost of carry, the volatility of the underlying asset price, and the number of time steps.

Regardless of the option valuation model specified, a computer-implemented information system is necessary to implement the settlement price determination methodology given the complexity of the mathematical calculations employed and the need for accuracy and computational speed. The computer-implemented information system may be constructed in countless ways so long as it has a computer, an input/output device; and a data storage device having encoded therein a set of computer-executable instructions that when executed cause the computer to implement the settlement price determination methodology of a Model Option Contract. Thus, the information system must be able to run the option pricing model specified and accept the input values specified in the Model Option Contract's cash settlement price determination methodology to calculate the cash settlement price.

Any form of database, computer program product, and computer usable medium having computer usable program code may be used as part of this system so long as it accomplishes these objectives. Thus, the computer readable medium may be comprised of volatile and non-volatile, removable and non-removable media implemented in any method or technology for storage of information such as computer-readable instructions, data structures, program modules or other data. Computer-readable media used in this system might be in the form of random access memory, read only memory, EEPROM, flash memory, CD-ROM, digital versatile disks, magnetic tape, magnetic disk, or any other medium which can be used to store this type of information.

This system may be enhanced by storing multiple sets of computer-executable instructions in the data storage device, with each set constituting an option valuation model that may be selected for use based on what is specified in a particular Model Option Contract. It may be further expanded to include the use of a database in a computer readable medium for storing the input values used by the system and output values that are produced by the system. Telecommunications equipment may be used to send and display the inputs to and the outputs from the system to and from multiple users.

Information systems used to run option valuation models are well know to option users and will not be described in detail in this specification as these systems by themselves are not the novel part of this invention. In the present invention, these information systems are used in a different way and for a different purpose than they have been used before.

In the past, option valuation models have been used by option users to help determine the theoretical value of an option contract. Having determined this theoretical value the option user could then compare it against the market price for the option contract to form a view about whether it should be traded or not. Counterparties were not under any contractual obligation to use a particular option valuation model or to use particular input values in that model. The holder of a traditional option could force delivery of the underlying asset by paying a strike price or try to sell the option, but he did not have the contractual right to force a cash settlement price generated as described in the present invention.

Model Option Contracts can be used in many different ways in conjunction with the market for traditional options or even when there is no market for traditional options on the underlying asset or over a specific time horizon.

BRIEF DESCRIPTION OF THE DRAWINGS

FIG. 1 is a table comparing the important contractual features of a Model Option with a traditional option.

DETAILED DESCRIPTION

FIGS. 1-5—Preferred Embodiments

Figure 2:
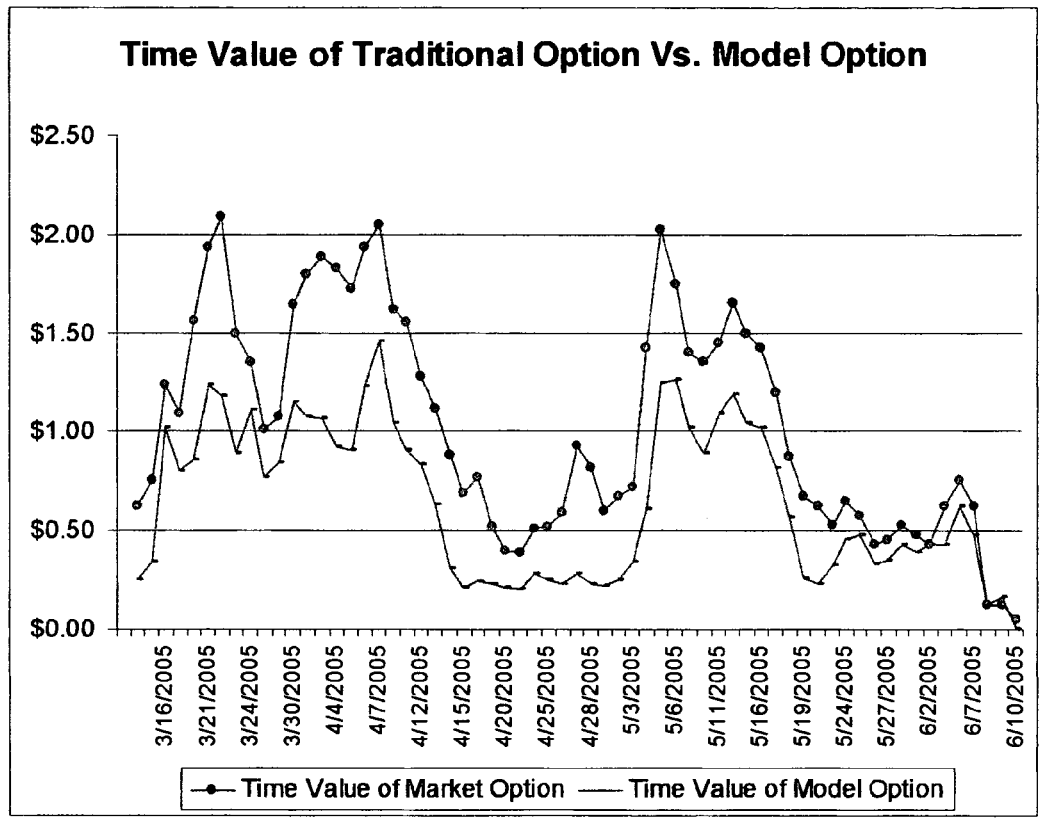
FIG. 2 demonstrates that the time value of the cash settlement price of a Model Option may be significantly different than the time value of a traditional option even when that option is on a very large company's stock and the traditional option is actively traded.

The following detailed description discloses various embodiments and features of the invention. These embodiments and features are meant to be exemplary and not limiting.

DEFINITIONS

The definitions provided below are to be applied to their respective terms or phrases as used herein unless the context of a given particular use of a given term or phrase clearly indicates otherwise.

The term "contract owner" refers to the owner of the Model Option Contract (also referred to as a "Model Option").

The terms "right to settle" and "settlement right" refer to the Model Option Contract owner's right to settle the contract by forcing the party that sold them the Model Option Contract, i.e. the option seller, to pay them a cash settlement price that is determined by using the settlement price determination methodology that is described in the Model Option Contract. By exercising this right to force delivery of the cash settlement price, the option holder is effectively extinguishing the contract by selling it back to the original contract seller.

The terms "cash settlement price" or "settlement price" refer to the cash price which the Model Option Contract holder or owner may force the contract's seller to pay in order to settle or extinguish the contract. The contract holder may force the option seller to pay this cash settlement price regardless of whether the contract is structured as a put or a call, and there is no accompanying transfer of the underlying or reference asset.

The term "traditional option terms" refers to the terms that are inherent part of any option contract. These terms are a standard part of any option contract and include such things as whether the option is a put or call, a description of the underlying asset, the strike price, the expiration date or contract term, and the holder's ability to exercise the option (American, European, Bermudian, etc.). Traditional option terms may be described in the Model Option Contract itself or by referencing the terms of another option contract.

The terms "specified settlement price determination methodology" or "settlement price determination methodology" refers to a methodology that is described in a Model Option Contract and used to determine the contract's cash settlement price. The settlement price determination methodology consists of two parts: a description of an option pricing model; and a description of how the input values, necessary to run the option pricing model, will be derived. Some of the input values will be obvious based on the terms of any option contract and need no additional specification. The additional input values required to run the model will need to be specified in the Model Option Contract so that no judgment is required to determine what values to use in the option pricing model.

The term "option pricing model" refers to any recognized and accepted mathematical model that is used to develop the theoretical value of an option. Black and Scholes, Whaley, Binomial Lattice, Trinomial Trees, and Merton's Jump Diffusion are examples of option pricing models. At least one option pricing model must be specified in a Model Option Contract to calculate its cash settlement price. More than one option pricing model may be specified in a Model Option Contract so long as it is clear under what circumstances each model will be used and how each model will be used to determine the cash settlement price.

The term "input values" refers to all of the values that are required to run the option pricing model specified in the Model Option Contract's settlement price determination methodology in an objective way. The values include traditional option terms that would be included in any option contract and require no additional description such as whether the contract is a put or a call and what the strike price is. These values also include additional input values that are necessary to run the option pricing model specified in the Model Option Contract. The additional input values may be specified as fixed terms, formulas, or references to some other indicia, or metric.

The term "additional input values" refers to each of the values, in addition to the values that can be derived from the traditional option terms, which are required to run the option pricing model. Additional input values must be specified in the settlement price determination methodology so that all of the inputs to option pricing model are unambiguous. These additional input values would not be determinable in any objective way if the Model Option Contract's specified settlement price determination methodology did not describe a particular input value to use or an objective means of determining that input value. The purpose of specifying the additional input values in the settlement price determination methodology is to eliminate any judgment that would otherwise be required to run the option valuation model and calculate the cash settlement price. The specification of these additional input values to the option valuation model may be described by stating a fixed value, a formula for determining the input, or a reference to some other metric. So long as it is definite how these inputs will be determined, the Model Option Contract will be legally valid and a cash settlement price will be determinable.

The term "information system" refers to one or more computers, servers, input devices, output devices, data storage devices, telecommunications equipment, computer-executable instructions (software) that is capable of implementing the settlement price determination methodology that is contained in a Model Option Contract. Information systems may communicate with other information systems via telecommunications means, such as the Internet. Information systems may also communicate with persons via input/output devices. Persons may communicate with other persons using information systems.

The term "computer program product" refers to software that an option user could employ to calculate a cash settlement price for a Model Option Contract. This software must in conjunction with a computer, an input/output device, and a data-storage device have the ability to implement the settlement price determination methodology embodied in a Model Option Contract. This software must be embodied in a computer usable medium and contain computer usable program code capable of accepting input values and running the option pricing model that is specified in the settlement price determination methodology of the Model Option Contract. It may also employ a database for reference, audit and control purposes that stores the inputs to and outputs from the option pricing model that is used to calculate the cash settlement price.

The term "compensation option" refers to an option that a company grants in exchange for work or other services.

The term "company" refers to any organization that is set up to make profits and includes stock companies, partnerships, limited liability companies, etc.

The term "exchange" refers to a place or mechanism that facilitates the trading of options. An exchange can be a physical location or an electronic mechanism where trading takes place or where information about trading is provided. An exchange may act as counterparty between buyers and sellers or it can merely provide information that enables buyers and sellers to trade directly with one another.

The term "personal property" includes corporeal personal property and incorporeal personal property.

The term "corporeal personal property" refers to commodities, animals, furniture, collectibles, merchandise, inventory, etc.

The term "incorporeal personal property" refers to financial instruments and intellectual property.

The term "financial instrument" includes any type of equity security, debt instrument, or derivative contract.

The term "equity security" refers to any ownership interest in a company including common stocks, preferred stocks, partnership interests, interest in a limited liability corporation, etc.

The term "debt instrument" refers to any evidence of indebtedness such as bills, notes, bonds, certificates of deposit, banker's acceptances, commercial paper, etc.

The term "derivative contract" refers to any contract that derives its value from an underlying financial asset, index or other type of investment including futures, forwards, index-linked securities, etc.

The term "intellectual property" refers to any intellectual property right such as patents, copyrights, trademarks, etc.

The term "real property" refers to land and all property attached to the land such as trees, buildings, and improvements.

Contract Overview

An overview of the key contractual differences between a Model Option Contract and a traditional option contract is shown by way of an example in FIG. 1. The table shows that the traditional option terms that must be specified in a traditional option must also be specified in a Model Option. Both options give the holder the right to pay $36 dollars to the option seller in order to get one share of Allstate Corporation's common stock at any time prior to the expiration of the options on Jun. 10, 2010.

Unlike the traditional option contract, the Model Option Contract gives the holder a right to settle the contract by forcing the option seller to pay a cash settlement price that can be calculated by using the settlement price determination methodology that is specified in the contract. This settlement right may be given in addition to or in lieu of the traditional rights that an option holder would have to sell the contract or to force an exchange of cash for the reference asset. In the present example, the Model Option Contract is structured so the option holder would have all three rights.

As shown in the table, the settlement price determination methodology must specify an option valuation model and the additional input values necessary to run that model. The contract must describe when the option holder may exercise his right to receive the cash settlement price.

In this example, the Model Option Contract holder has the right to force the option seller to pay the cash settlement price within three hours after the daily close of the New York Stock Exchange. Alternatively, this settlement right might have been structured so that the holder could exercise it continuously over the life of the contract, at certain other predefined points between inception and expiration, or at the contract's expiration. It might also be structured so that this right is only present if certain conditions are met, as more fully described above in the Summary section.

The Model Option Contract shown in FIG. 1. specifies that a Generalized Black & Scholes option valuation model be used to determine the cash settlement price. It also specifies how all of the inputs to that model will be derived. Some of the inputs to the Black & Scholes model, such as whether the contract is a put or a call and the strike price, can be derived from the traditional option terms specified in the contract. However, additional input values must be specified to eliminate any ambiguity about what values will be used as the inputs to the specified option valuation model.

In the example shown, the parties to the Model Option Contract specify the asset price that will be used, how the time to maturity will be calculated and fixed values for the risk-free rate of return, the dividend yield, cost of carry, and volatility. However, it is important to note that the parties could have agreed to derive each of these values by reference to some other term, indicia, metric, contract, or formula instead of using the particular values or formula shown. For example, the parties might instead have agreed to use the 90-day US Treasury bill yield on the valuation date as the risk-free rate, the last dividend payment annualized as a percentage of the current stock price as the dividend rate, and the annualized standard deviation of the daily change in the underlying stock's price over the preceding 30 trading days as the volatility.

It is also important to note that the input values specified in the Model Option Contract do not have to make sense in the context of trying to derive a theoretically correct value for an option because that is not the purpose for which the option valuation model is being used. In fact, traditional option valuation models are not able to produce theoretically correct values for Model Option Contracts anyway since they cannot and do not take into account the cash settlement right that a Model Option Contract has.

Depending on the objective of the parties, there are countless ways of specifying each of these input values and multiple objectives that the parties might pursue in choosing a particular input. For example, the volatility input to the Black and Scholes Model could be specified as a formula that captures the underlying asset's historical price variations, it could be specified as a formula that captures the historical price variations of some other indicia that serves as a proxy for the underlying asset; and it could also specify a formula and then increase or decrease that number by some degree or amount. If the underlying asset is a tech stock, the historical volatility of a tech stock index might be referenced. One could also specify the volatility input by describing a formula that would calculate implied volatility for the underlying asset or some other relevant benchmark.

The critical thing is that the Model Option Contract provides enough description so that no judgment is required to determine which option valuation model must be used, what input values must be used in the model to calculate the cash settlement price, and when the holder has the ability to demand the cash settlement price. So long as it is definite how and which option valuation model(s) will be used, how the inputs to the model(s) will be determined, the parties will be able to calculate the settlement price in an objective way and the Model Option Contract will be legally valid.

In a traditional option, the option holder may be able to exercise the option and force delivery of the underlying asset at any time, at set intervals, or only at the expiration of the contract. Model Option Contracts may be structured in a similar fashion, but they may also be structured so that they do not permit the delivery of the underlying asset and only offer the opportunity for a cash settlement price that is determined by the contract's settlement price determination methodology.

Model Option Contracts may be structured so that they permit the option holder to capture the time value of an option regardless of whether there is a third party willing to buy the option or whether the option holder has the right to sell the contract to a third party. Another feature of a Model Option that distinguishes it from a traditional option is that, by manipulating the inputs to the settlement price determination methodology, the time value of a Model Option Contract can be decoupled into its component parts. This enables option traders to trade each component value separately. If for example they were only interested in hedging or speculating about the volatility or the dividend rate it would be much more effective and efficient to trade just that component of an option's value.

Comparing Option Performance

FIG. 2 compares the time value of a General Motors put with a strike price of $30 and an expiration date of Jun. 18, 2005 with the time value of the settlement price of a Model Option with similar basic option terms. The Model Option Contract specified that the right to put the contract back to the option seller would be valued by using the Black and Scholes option pricing model; that 2.8% would be used as the risk-free rate (this was the three month Treasury yield at the beginning of the contract); that 6.25% would be used as the dividend yield; and that the volatility input to the model would be based on the preceding year's stock price movements.

Volatility was calculated by taking the standard deviation of the log value of the ratio of daily price change in GM stock for the preceding 252 trading days and multiplying that number by the square root of 252. This calculation was updated each day based on the price changes in the underlying stock over the preceding 252 days.

Despite the fact that the time value of the settlement right in the Model Option and the time value of the traditional option move in similar directions and end up with the same value at expiration, the paths they take to this destination are different. The traditional option's time value is determined by the option market's perception of where General Motor's stock would be by the expiration date. The time value of the Model Option's settlement value is based on various input factors, the most important of which is the historical volatility of the underlying stock price. As the expiration date approaches, the time value of both options diminishes to the point where it becomes inconsequential.

Based on the chart one can see that the difference between the two options' time value would have been significant to both of the parties. The average difference over this time horizon, measured in terms of the initial price of the option, was 60%, but there were eleven days when the difference was over 100%.

This difference is the result of the prevailing market opinion that GM's stock price would fall over this period. To account for this sentiment in terms of an option model, one would say that "implied volatility" of the traditional option was much higher than historical volatility that was used to value the settlement right of the Model Option. However, since the settlement right of the Model Option is based on the historical price volatility, it never incorporates this current market bias.

The Model Option that was specified in this example was used for illustrative purposes only. The volatility input value specified in the Model Option might have been expressed in many different ways, and some of these ways might have made the cash settlement feature of a Model Option worth more than the traditional option. In this case, the volatility input value of the Model Option would be greater than the volatility implied by the market.

Operation of the Invention—Bilateral Contract Construction and Valuation

Figure 3:
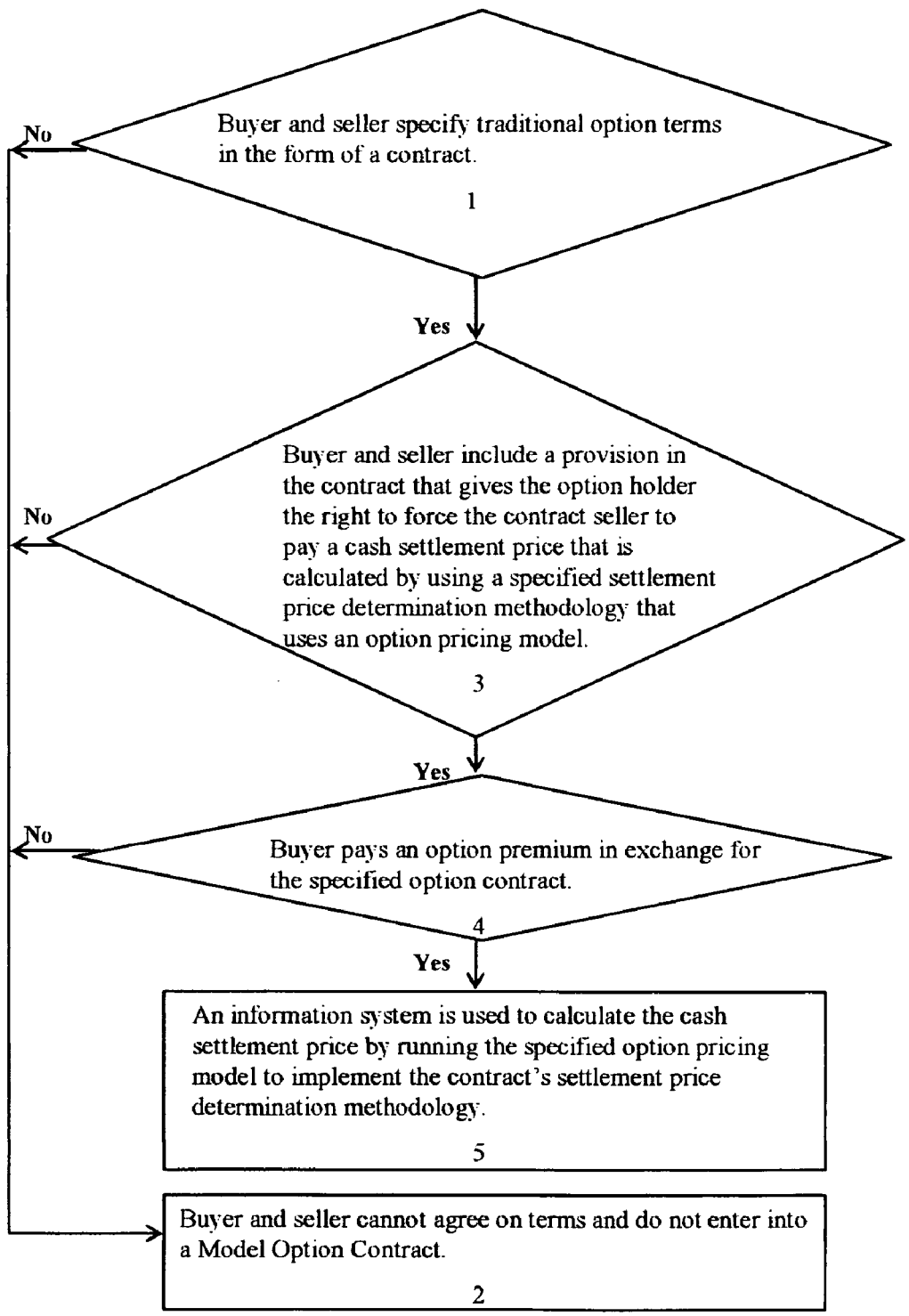
FIG. 3 is a flowchart that shows how a buyer and seller might use this method to construct and execute a Model Option Contract and calculate its cash settlement price.

An overview of how a buyer and seller might use this method to construct and execute a Model Option Contract and determine its settlement price is shown in FIG. 3. To enter into a Model Option Contract, a buyer and seller must first specify and agree on the traditional option terms in the form of a contract 1.

Next, the buyer and seller must include a provision in the contract that gives the option holder the right to force the contract seller to pay a cash settlement price that is calculated by using a specified settlement price determination methodology that uses an option pricing model 3. This methodology must also specify exactly which option pricing model will be used and all of the input values that will be necessary to run the model so that no judgment is required to calculate the cash settlement price.

If they can agree on these terms then the buyer will pay the seller an option premium in exchange for the specified contract 4. If they are unable to agree on the traditional option terms, the terms of the additional cash settlement right, the terms of the settlement price determination methodology, and the option premium, they will not enter into a Model Option Contract 2.

Finally, a computer-implemented information system is used to implement the settlement price determination methodology and calculate a cash settlement price 5. At a minimum such as system will require a computer, an input/output device and a data storage device having encoded therein a set of computer-executable instructions that will enable the system to implement the Model Option Contract's settlement price determination methodology and run the specified option pricing model. However, it would be useful if such as system also comprised a database in a computer readable medium for storing input values to the option pricing model and the cash settlement prices calculated by the system.

An information system is necessary given the complexity of the mathematical calculations employed and the need for accuracy and computational speed. In practice, both the option seller and the option holder may use their own information systems to perform this calculation.

The information systems required to implement the settlement price determination methodology and calculate the cash settlement price can be constructed in countless ways. One can devise a computer program product that Model Option Contract users would run on their own computers. Alternatively, one might construct an information system that users could interact with using various means of telecommunication.

A computer program product for calculating a cash settlement price for a Model Option Contract can be devised quite simply so long as it is in a computer usable medium and has computer usable program code embodied in it that enables it to implement the Model Option Contract's settlement price determination methodology. It does not matter what type of computer usable medium or what type of programming is used so long as this objective can be obtained.

At a minimum, this requires that the computer usable program code contains the option pricing model specified by the contract and that it has the ability to accept the input values necessary to run the option pricing model and calculate the contract's cash settlement price as specified in the Model Option Contract's settlement price determination methodology. However, a more sophisticated system may contain multiple option valuation models and will also store input values and settlement prices in the form of a database for future reference.

Having calculated the cash settlement price, the option holder may decide to exercise the settlement right, forcing the option seller to pay a cash settlement price in return for extinguishing the Model Option Contract. Effectively, this additional settlement right enables the Model Option Contract holder to sell the contract back to the option seller.

Operation of the Invention—Model Option Used as Compensation

Figure 4:
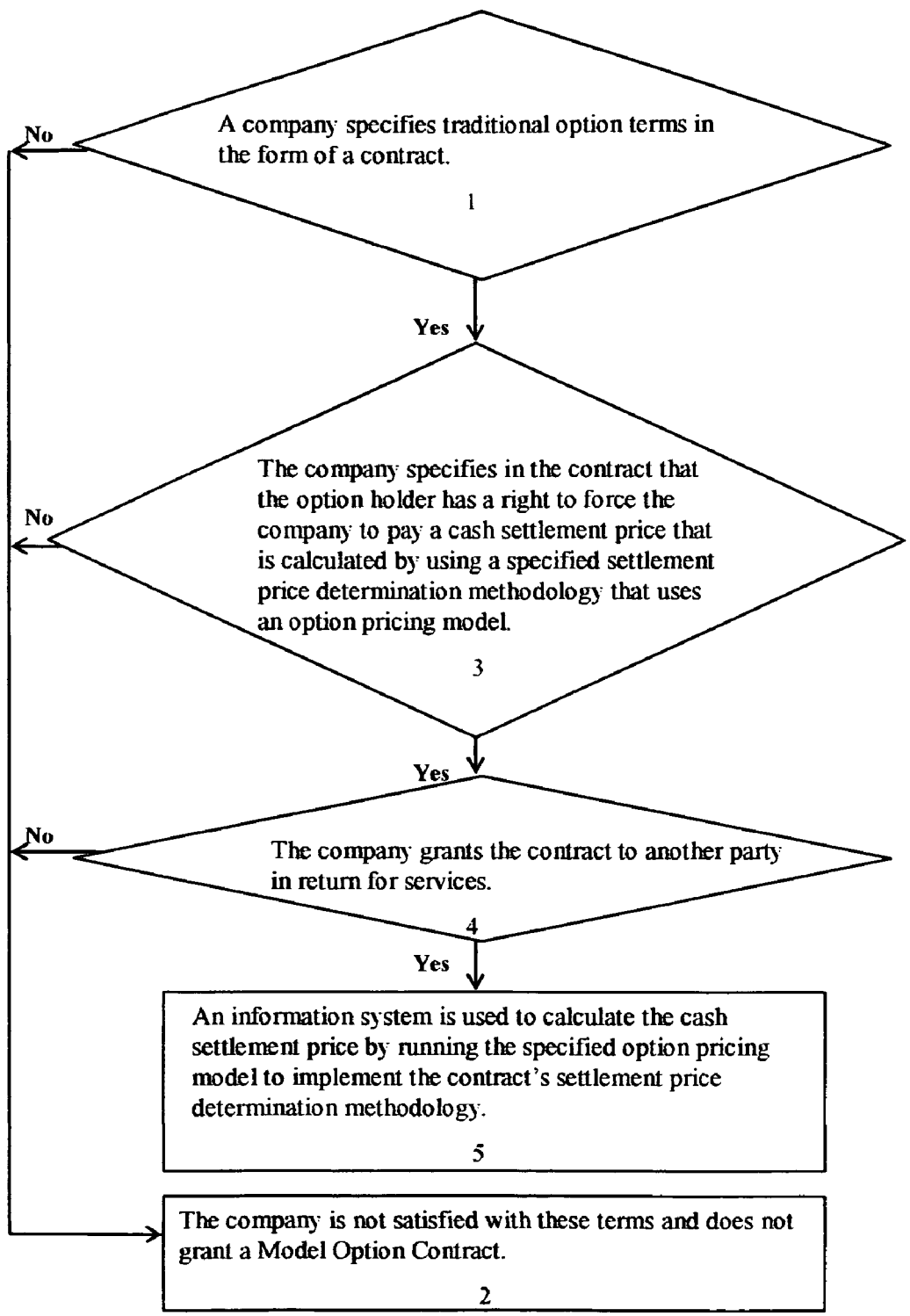
FIG. 4 is a flowchart that shows how a company might use this method to construct a Model Option Contract used for compensation purposes and calculate its cash settlement price.

FIG. 4 is a flowchart showing how a company would use this business method to grant a compensation option and how it would determine the cash settlement price of the Model Option it conveys. First, the company specifies in the contract the traditional option terms in the form of a contract 1. Next the company specifies in the contract that the contract holder will have the right to force the company to pay a cash settlement price that is calculated by using a specified settlement price determination methodology. This methodology requires specification of an option pricing model 3 and each of the inputs necessary to run the model. This is more fully described above in the Summary section and in the description pertaining to FIG. 3.

If the company is satisfied with all of these terms, it grants the Model Option Contract to another party in return for future services 4. If it is not satisfied, it does not grant the Model Option 2.

Assuming a grant is made, an information system is used to calculate the settlement price by implementing the specified settlement price determination methodology 5. An information system is necessary given the complexity of the mathematical calculations employed and the need for accuracy and computational speed.

The process shown in FIG. 4 is very similar to the one shown in FIG. 3, but it more accurately describes the process as pertaining to the development, issuance, and valuation of a unilateral contract devised to compensate another party for services. In practice, companies typically specify that such contracts are "vested" over some future period of time.

Companies use vesting to ensure that the grantees only get the full value of the option over a period of months or years of future service. Also, options used for compensation are not typically transferable to a third party, further limiting the rights of the grantee to capture the full time value of the option grant. Each of these contractual limitations may also be employed in Model Options that are constructed as compensation options.

Operation of the Invention—Exchange Traded Model Option

Figure 5:
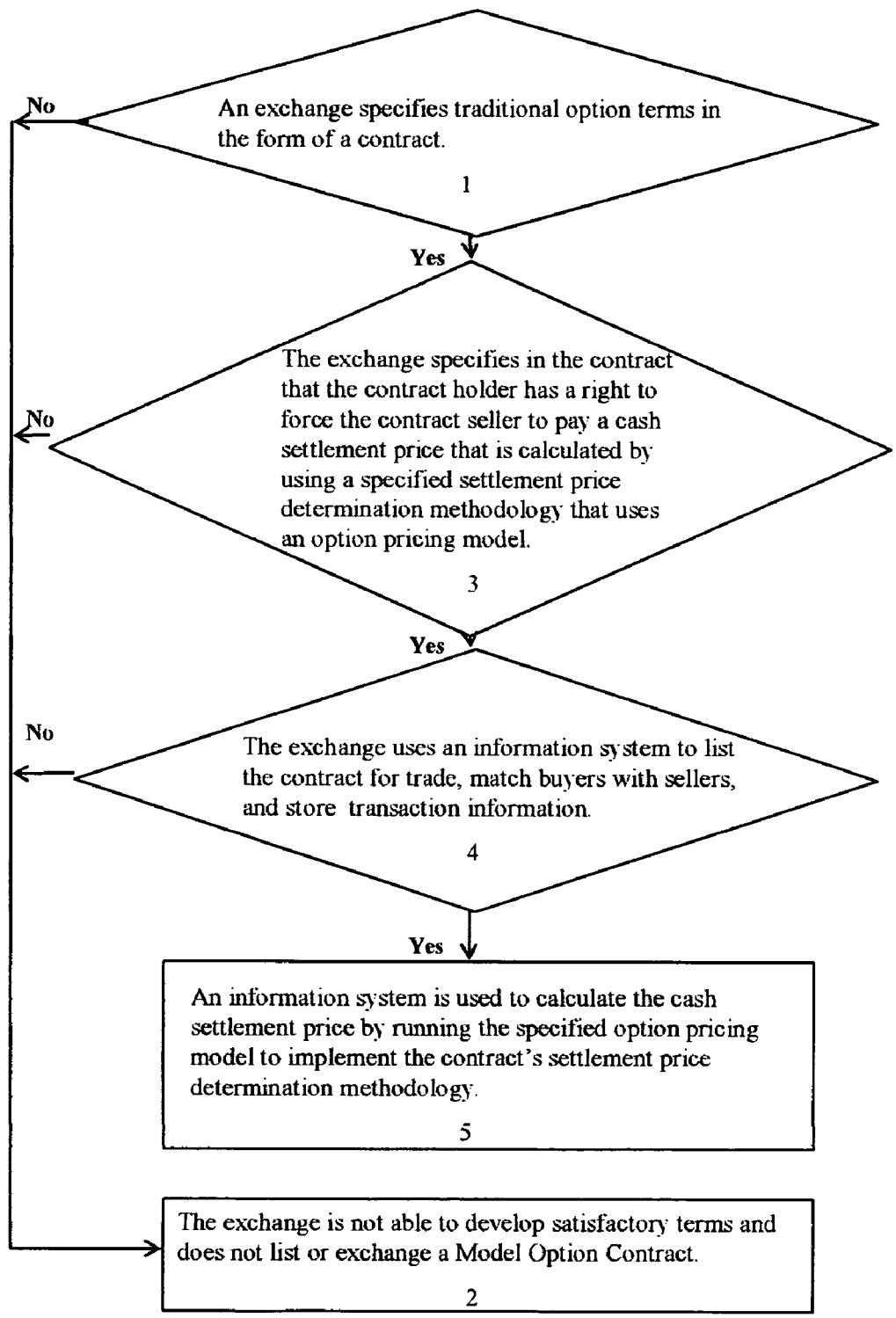
FIG. 5 is a flowchart that shows how an exchange could use this method to construct and trade a Model Option Contract and calculate its cash settlement price.

FIG. 5 shows how an exchange would construct a Model Option Contract, list it for trade, match buyers with sellers, store transaction information and determine a settlement price for the contract. First, the exchange must specify the traditional option terms in the contract 1. Next it must specify in the contract that the contract holder will have the right to force the option seller to pay a cash settlement price that is calculated by a settlement price determination methodology 3. This methodology would specify the option valuation model and the additional input values necessary to run the model and calculate the cash settlement price. This is more fully described above in the Summary section and in the description pertaining to FIG. 3.

Although the exchange is solely responsible for the development of the Model Option Contract, in practice, it will solicit feedback from its members and other option users to determine the features that are most attractive and acceptable. In effect, the specifications of each contract would be predetermined by the exchange, and the buyer and seller would merely agree to trade a particular contract that is listed by the exchange. This eliminates the need for a buyer and seller to agree on each term individually.

The exchange uses at least one information system to list the Model Option Contract for trade, match buyers with sellers, effectuate the option purchase and sale and store the transaction information 4. If the exchange is not able to develop satisfactory terms, it does not list or exchange the Model Option Contract 2.

If the exchange is able to list and transact a Model Option Contract, an information system is necessary to implement the specified settlement price determination methodology and calculate the settlement price 5. An information system is necessary given the complexity of the mathematical calculations employed and the need for accuracy and computational speed. This feature is described more fully in FIG. 3.

Depending on the functions that the exchange performs, it may be a counterparty on each of the trades or it may only facilitate trade between its members. Either way, determining this price is very valuable from a risk management perspective since it enables parties to monitor and manage their counterparty credit risk.

ADDITIONAL EMBODIMENTS

Although three basic ways of constructing a Model Option Contract and determining its cash settlement price are described above, Model Options can be structured in countless ways by changing the underlying asset that is referenced, the strike price, the expiration date, the option holder's ability to exercise the option, the option holder's right to force the contract's seller to pay a cash settlement price, the option holder's ability to sell the contract, and by changing the variables in the settlement price determination methodology that is employed.

Model Option Contracts can reference any type of real or personal property. With Model Options, the contract can eliminate the option holder's ability to force delivery of the underlying asset or sell the contract to a third party since the contract holder can force the contract seller to pay the specified cash payment to extinguish the contract. Model Options can be structured so that each component of option valuation may be traded separately.

Additionally, Model Option Contracts can be structured so that they form one or more provisions in some other type of contract, such as a purchase and sale agreement, a lease, an equity or security, instrument of indebtedness, a futures contract, a forward contract, an annuity, etc.

CONCLUSION, RAMIFICATIONS, AND SCOPE OF INVENTION

From the description above it should be clear that this method of constructing an option contract and calculating a cash settlement price satisfies many purposes that can not be accomplished by constructing and using traditional options. Incorporating a specified settlement price determination methodology and a settlement right into an option contract makes option trading more understandable, more certain, and less costly. Model Option Contracts help expand option usage by permitting buyers and sellers to use options in ways that are currently impossible.

Model Option Contracts eliminate the need for the price discovery function of an exchange. This enables trading on small company stocks, on long-duration options, and on deep out-of-the-money options that is not possible presently due to a lack of liquidity, and concerns about the potential for pricing distortions and manipulation.

Model Option Contracts eliminate the importance of small speculators to the price discovery process. This, in turn, lessens the importance of the credit risk management function that large exchanges provide. Absent the need for a price discovery function and a credit risk management function, it is possible for smaller exchanges consisting of large creditworthy participants to trade Model Option Contracts with much lower transaction costs.

Model Option Contracts permit the buyer and seller to agree that the contract will never be exercised in the traditional way by forcing delivery of the underlying asset. This prevents unnecessary trading since the buyer can receive value without having to force delivery of the underlying asset or engage in other trading to close out or rebalance a given trading position.

By reducing transaction costs, it becomes feasible for large institutions to buy and sell deep out-of-the-money Model Option Contracts that have very small expected values. Currently, such trading is infeasible because, at a certain point, the cost of trading exceeds the expected value of the options.

By using Model Option Contracts as compensation for services (a compensation option), companies and individuals can gain the benefits of financial leverage while gaining certainty over the expense and the value associated with these options.

By agreeing to give the holder an additional cash settlement right and to use the settlement price determination methodology to determine the value of that right, investors can use Model Option Contracts to create more precise hedges.

Using Model Option Contracts, investors can eliminate the right to take delivery of the reference asset, disaggregate each of the component values of an option's price, and trade each of these values separately. This is impossible with traditional options.

Although the description above contains certain specifics, these should not be construed as limiting the scope of the invention but as merely providing illustrations of some of the presently preferred embodiments of this invention. This methodology can be applied in many ways to all types of options, on all types of assets and can be used on options that are traded on exchanges or between two parties directly. Thus the scope of the invention should be determined by the appended claims and the legal equivalents, rather than by any particular example described above.

I claim:

1. An information system operative for calculating a settlement price for a Model Option Contract, comprising:
a data storage device configured to store information pertaining to the Model Option contract, an option contract that confers a contractual right that enables the option contract's holder to force delivery of a cash settlement price that is determined by using a settlement price determination methodology that is specified in the option contract, the settlement price determination methodology including a description of an option pricing model and input values to be used to run the option pricing model;
a computer linked to the data storage device configured to:
receive the option pricing model specified in the settlement price determination methodology of the Model Option Contract;
receive the input values to be used run the option pricing model as specified in the settlement price determination methodology of the Model Option Contract; and
calculate the cash settlement price of the Model Option Contract by using the input values to be used to run the option pricing model as specified in the settlement price determination methodology of the Model Option Contract.

2. The information system of claim 1 that is further configured to store the cash settlement price in the data storage device.

3. The information system of claim 1, wherein a Black and Scholes option pricing model is used to implement the Model Option Contract's settlement price determination methodology and calculate the cash settlement price.

4. The information system of claim 1, wherein a Whaley option pricing model is used to implement the Model Option Contract's settlement price determination methodology and calculate the cash settlement price.

5. The information system of claim 1, wherein a Binomial Lattice option pricing model is used to implement the Model Option Contract's settlement price determination methodology and calculate the cash settlement price.

6. The information system of claim 1, wherein a Trinomial Lattice option pricing model is used to implement the Model Option Contract's settlement price determination methodology and calculate the cash settlement price.

7. The information system of claim 1, wherein a Merton's Jump Diffusion option pricing model is used to implement the Model Option Contract's settlement price determination methodology and calculate the cash settlement price.

8. A computer-implemented method operative for calculating a cash settlement price for a Model Option Contract, comprising the steps of:
receiving and storing in a data storage device linked to a computer information pertaining to the Model Option contract, an option contract that confers a contractual right that enables the option contract's holder to force delivery of a cash settlement price that is determined by using a settlement price determination methodology that is specified in the option contract, the settlement price determination methodology including a description of an option pricing model and input values to be used to run the option pricing model;
receiving and storing in the data storage device linked to the computer the option pricing model specified in the settlement price determination methodology of the Model Option Contract;
receiving and storing in the data storage device linked to the computer the input values to be used to run the option pricing model specified in the settlement price determination methodology of the Model Option Contract; and
using the computer to calculate the cash settlement price of the Model Option Contract by using the input values to be used to run the option pricing model as specified in the settlement price determination methodology of the Model Option Contract.

9. The computer-implemented method of claim 8, wherein the further step of storing the cash settlement price in the data storage device linked to the computer is performed.

10. The computer-implemented method of claim 8, wherein the computer uses a Black and Scholes option pricing model to implement the Model Option Contract's settlement price determination methodology to calculate the cash settlement price.

11. The computer-implemented method of claim 8, wherein the computer uses a Whaley option pricing model to implement the Model Option Contract's settlement price determination methodology to calculate the cash settlement price.

12. The computer-implemented method of claim 8, wherein the computer uses a Binomial Lattice option pricing model implement the Model Option Contract's settlement price determination methodology to calculate the cash settlement price.

13. The computer-implemented method of claim 8, wherein the computer uses a Trinomial Trees option pricing model to implement the Model Option Contract's settlement price determination methodology to calculate the cash settlement price.

14. The computer-implemented method of claim 8, wherein the computer uses a Merton's Jump Diffusion option pricing model to implement the Model Option Contract's settlement price determination methodology to calculate the cash settlement price.

* * * * *